United States Patent [19]
Watson

[11] 3,994,059
[45] Nov. 30, 1976

[54] METHOD AND APPARATUS FOR ASSEMBLING OIL FILTER COMPONENTS

[75] Inventor: Edward F. Watson, Chatham, N.J.

[73] Assignee: Purolator, Inc., Rahway, N.J.

[22] Filed: Dec. 10, 1975

[21] Appl. No.: 639,251

[52] U.S. Cl. .............................. 29/429; 29/208 B; 29/211 R; 29/238; 29/464; 55/504; 210/238; 210/455
[51] Int. Cl.² .......................................... B23P 19/00
[58] Field of Search.......... 29/429, 450, 238, 208 R, 29/211 R, 208 B, 464; 210/455, 238; 55/509, 504

[56] References Cited
UNITED STATES PATENTS

| | | | |
|---|---|---|---|
| 3,241,224 | 3/1966 | Banister et al. | 29/429 |
| 3,248,785 | 5/1966 | Aidlin | 29/211 R X |
| 3,300,846 | 1/1967 | Jones | 29/211 R X |
| 3,336,654 | 8/1967 | Ryan | 29/429 |
| 3,490,595 | 1/1970 | Krynski et al. | 210/238 |
| 3,530,565 | 9/1970 | Lanza et al. | 29/429 X |
| 3,541,667 | 11/1970 | Patzak et al. | 29/429 |
| 3,588,985 | 6/1971 | Shields | 29/211 R X |
| 3,623,210 | 11/1971 | Shields | 29/429 |
| 3,733,680 | 5/1973 | Cartwright | 29/429 |

Primary Examiner—Charlie T. Moon
Attorney, Agent, or Firm—Staas & Halsey

[57] ABSTRACT

A method and apparatus for assembling oil filter components is disclosed. The components include a spring guide element which centers a filter element when assembled within a filter canister. Invention is based on the discovery that when the spring guide element is pushed horizontally into the canister by the filter element, the leading edge of the spring guide element automatically slides up the dome shaped bottom of the canister to its proper upright position without need for manual (individual) handling. An assembly machine is also disclosed which provides feed chutes for supplying the canisters, spring guide elements, and filter elements to troughs on a conveyor belt. A stationary bar cam is provided for effecting a force vector in a direction which pushes the filter element and, in turn, the spring guide element into the canister. Alternate embodiments are also disclosed wherein the components may be assembled by centrifugal force, gravity or direct plunger action.

20 Claims, 12 Drawing Figures

METHOD AND APPARATUS FOR ASSEMBLING OIL FILTER COMPONENTS

BACKGROUND OF THE INVENTION

1. Field of the Invention

The present invention pertains to an improved method of assembling components of an oil filter and a mechanism for performing the improved method.

2. Description of the Prior Art

In the past, in order to assemble oil filters, complex mechanisms were developed for accurately inserting and positioning a spring guide element in the concave end of a filter canister prior to placing the filter element itself into the canister. The spring guide element is used for centering the end of the filter element within the filter canister for accurate alignment with respect thereto, and it is conventional to perform a separate step of inserting and seating the spring guide element in its proper position prior to the step of inserting the filter element. A simplified method of assembly which eliminates the separate step of seating the spring guide element and a corresponding simplified mechanism for performing that method is therefore a desirable improvement.

SUMMARY OF THE INVENTION

The present invention is based upon a discovery by the applicant that due to the shape of the components employed in a conventional oil filter, a simplified method of assembling those components was possible. It is the applicant's discovery that by lying a filter canister on its side and placing an elongated spring guide element horizontally and longitudinally onto the inside cylindrical wall of the canister, the insertion of the filter element horizontally into the canister pushes the spring guide element and causes the leading edge of the spring guide element to slide up the concave end of the canister, automatically stand upright, and thereby become properly seated in the canister. During assembly, the canister, the spring guide element and the filter element are arranged respectively in a slide trough carried by a conveyor. The force necessary to slide the two elements into the canister is provided by the motion of the conveyor contacting the filter element against a stationary bar cam which angularly traverses the direction of the conveyor. The force against the filter element causes it to slide along the trough pushing the guide element before it and into the canister where the leading edge of the guide element slides up the concave end of the canister. Alternatively, the force necessary to slide the two elements into the canister is provided by centrifugal force, wherein the conveyor carrying the troughs makes a sharp turn which causes the two elements to slide into the canister. A second alternative of providing the sliding force is through the employment of gravitational forces, wherein the conveyor carrying the troughs contains a partial twist which elevates the location of the two elements with respect to the canister, causing the elements to slide into the canister. A third alternative for providing the necessary sliding force is by direct plunger action, wherein the stationary bar cam recited above is replaced by a mechanism which, in a reciprocating motion, directly pushes the filter element and the guide element into the canister. Of course other alternatives may also be devised which incorporate the applicant's basic discovery of a single sliding motion of the two elements into the canister to provide proper seating of the elements within the canister.

DETAILED DESCRIPTION OF THE INVENTION

Figure 1:
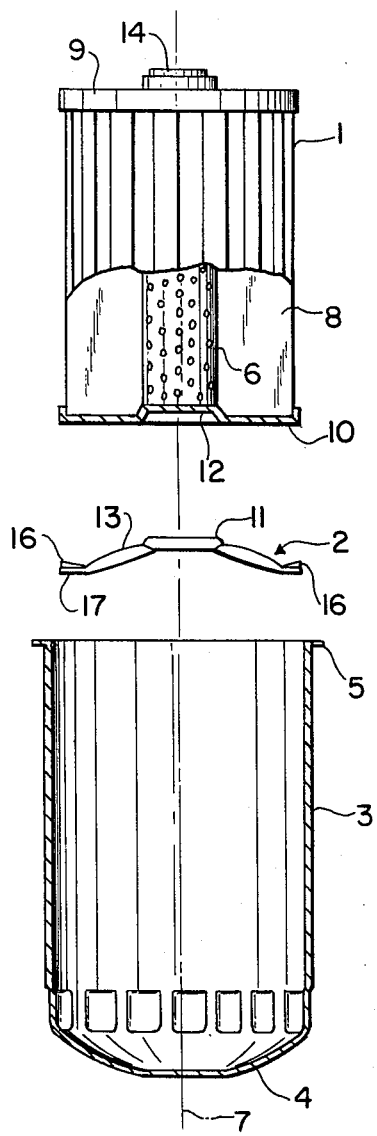
FIG. 1 is an exploded view of the components of a filter to be assembled in accordance with the subject invention.

FIG. 1 shows an exploded view of the components of a filter to be assembled in accordance with the subject invention for the purpose of centering a cylindrical filter element inside a canister type container. A cylindrically shaped oil filter element 1 is shown in partial cross-section, aligned along a centering reference line 7 with a spring guide element 2 and a cylindrical container 3, shown in cross-section. The container 3 is conventional, typically of light-weight sheet metal of cylindrical configuration with a dome shaped, and hence internally concave bottom 4. The cylindrically shaped filter element 1 is a vertically rigid structure comprising a perforated core 6, about which is positioned filter material 8. Material 8 is of a standard type which may include pleated paper, fiberous material, or any other material commonly used to filter foreign material from a liquid flowing therethrough. The filtering material 8 is held in position around said perforated core 6 by upper end plate 9 and lower end plate 10 sealed thereto and attached to the opposite ends of the core 6. An outlet 14 is shown for allowing fluid pumped through said filter material 8 and said perforated core 6 to escape. The lower plate 10 contains a circular centering depression 12 which is concentric with the center axis of the filter element 1.

The spring guide element 2 is made of spring steel or the like and is formed with a substantially circular protuberance 11 and two downwardly extending spring-like arms 13, each with a lateral end flange 17. The arms 13 provide a cantilever spring function against the filter element when a cover plate (not shown) is attached to the opening of the container 3, in an operation described in U.S. Pat. No. 3,490,595. The protuberance 11 has a slightly lesser diameter than the diameter of the centering depression 12 on the lower end plate 10 of the filter element 1, in order to allow for mating therebetween. The container 3 has an inside diameter sufficiently large enough to allow the filter element 1 and the guide element 2 to be contained therein, providing a concentric flow gap 16 for fluid to enter the filter. The guide element 2 is generally elongated and has a length which approximately corresponds to the diameter of the filter element 1.

Figure 1A:
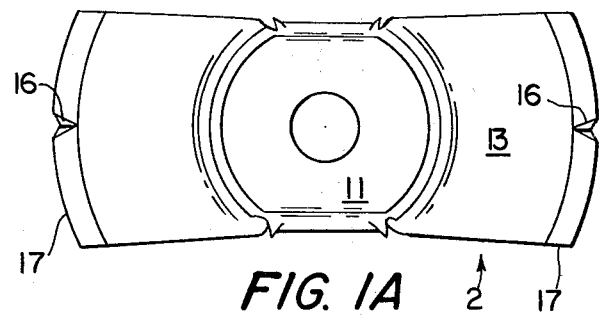
FIG. 1A is a top view of the guide element used in the present invention.

FIG. 1A shows a top view of the spring guide element 2 structure formed of spring steel or the like. By concurrent reference to FIGS. 1A and 1B, the guide element 2 is shown having a substantially circular protuberance 11 and elongated arms 13, which downwardly extend therefrom in such a way as to cause the protuberance 11 to be elevated with respect to the end flanges 17 of said arms 13. Therefore, when said guide element 2 is seated in a proper upright position within the container 3, the flanges 17 of the arms 13 rest against the interior surface of bottom 4, as the protuberance 11 provides a seat for the filter element 1. The flanges 17 contain slightly raised portions 16 which are not conventional but are provided to facilitate the handling of the guide element 2 by a feed mechanism to be described later.

Figure 2:
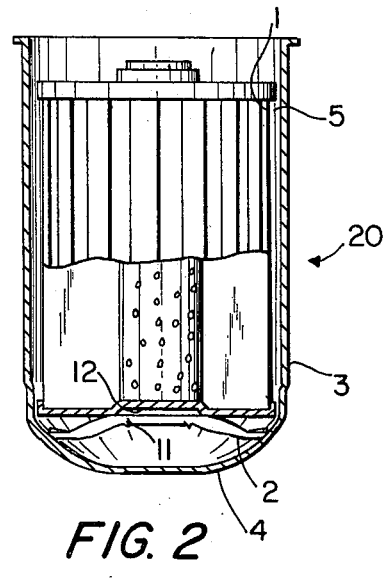
FIG. 2 is a partial cross-sectional view of the components shown in FIG. 1, after assembly.

FIG. 2 shows a cross-sectional view of an assembled oil filter unit 20 comprising the guide element 2 seated in the container 3. The element 2 is shown seated within the container 3 against the internal surface of the dome shaped bottom 4. Upon assembly, the proper seating of the guide element 2 correspondingly centers the filter element 1 within the container 3, since the guide element 2 seeks an equilibrium state by being forced against the dome shaped internal surface of the bottom 4 and becomes centered. The centered filter element 1 is shown providing a concentric flow gap 16 to allow filtered oil to enter said filter unit 20. The filter element 1 is seated, since the centering depression 12 is mated with the protuberance 11 on the guide element 2. When the filter unit 20 is provided with a cover plate (not shown) in a later operation described in the aforesaid U.S. Pat. No. 3,490,597, the filter element 1 will be compressed into the container 3 and the guide element 2 will maintain the filter element 1 in a securely centered position.

Figure 3A:
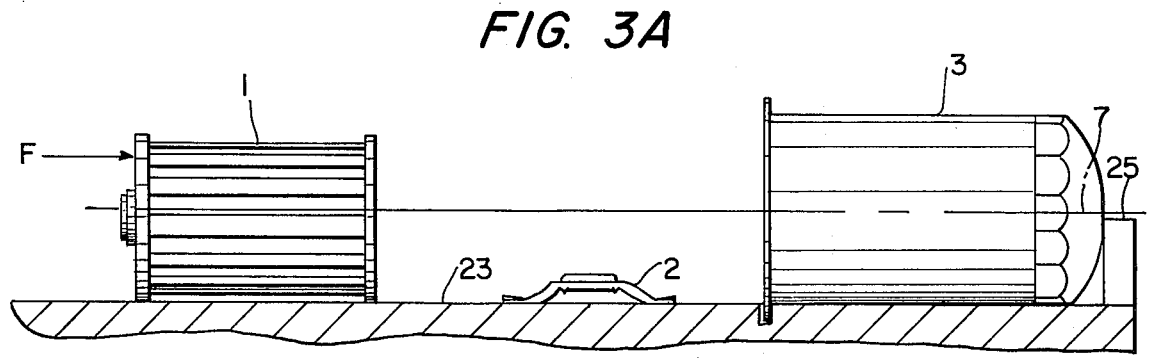
FIGS. 3A through 3E show the various positions of the three major elements during the assembly sequence.

FIGS. 3A to 3E sequentially show the positions of the filter element 1 and the guide element 2, with respect to the container 3, when a force vector F is applied to the filter element 1. FIG. 3A indicates a center reference line 7, which corresponds to the center of the cylindrical container 3 and parallels a surface indicated as 23, along which the elements 1 and 2 slide towards the container 3. The surface 23 extends to the lip 5 of the opening of the container 3 and provides a smooth path for the elements 1 and 2 as they slide into the container 3, while a stop 25 prevents the container 3 from sliding during assembly.

Figure 3B:
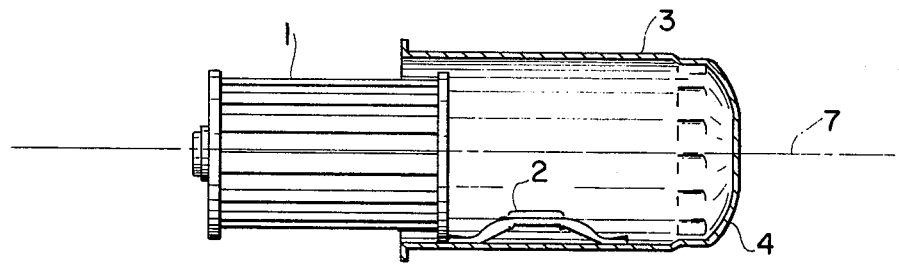
Figure 3C:
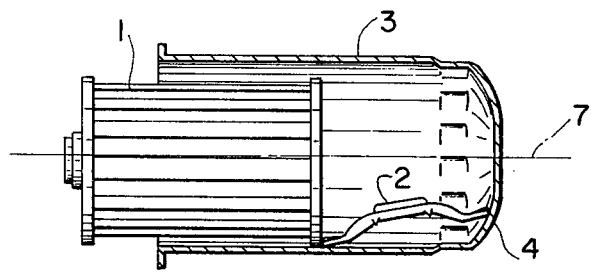
Figure 3D:
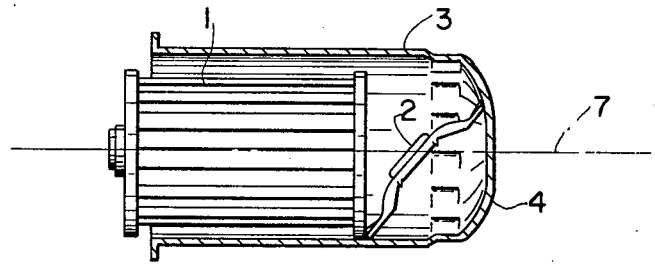
Figure 3E:
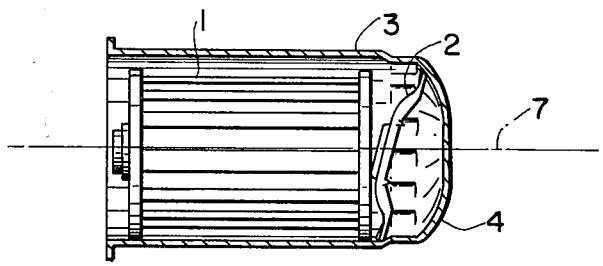

FIG. 3B shows the guide element 2 having entered container 3 (shown in cross-section) and being pushed by filter element 1. In FIG. 3C, filter element 1 is continued to be forced into the container 3 and the leading edge of the guide element 2 slides up the internal surface of the dome shaped bottom 4. FIGS. 3D and 3E show the guide element 2 as it continues to be forced to slide up the internal surface of the bottom 4, approaching an upright position. Referring back to FIG. 2, the guide element 2 is shown seated in the container 3 by virtue of achieving its proper upright position with respect to the filter element 1 and the container 3 as a result of the motion of the elements indicated in FIGS. 3A through 3E. Filter element 1 is shown centered with respect to the container 3 and the reference line 7 by the mating of the protuberance 11 of the guide element 2 with the circular depression 12 of the filter element 1 (shown in cross-section). As can be seen by reference to the above figures, the described invention provides for a simplified assembly of oil filter components namely a filter element 1 within a container 3, with concentric centering provided by a single linear motion of the element 1 which pushes the preceding guide element 2.

Figure 4A:
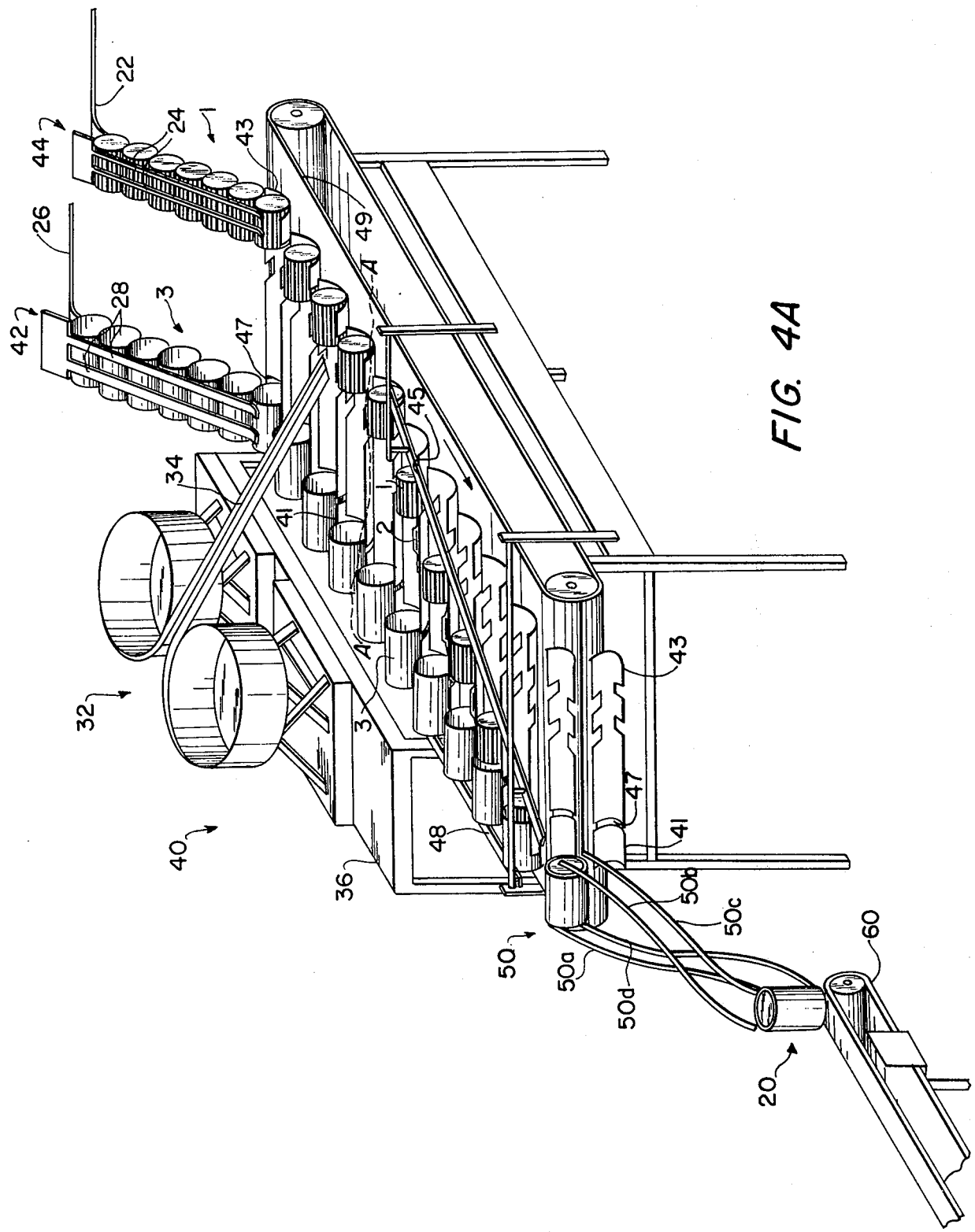
FIG. 4A is a perspective view of the automatic assembly machine employed in performing the assembly according to the present invention.

FIG. 4A is a perspective view of an automated assembly mechanism generally designated 40, which is an embodiment for performing the present invention. Conveyor belt 49 includes a plurality of laterally extending container troughs 41 and a like number of corresponding slide troughs 43 longitudinally aligned with the said container troughs 41. It is understood that the troughs are not restricted to any particular shape, but must provide a sliding surface for the elements into the container, and may even be an integral part of the conveyor 49. Feed mechanism 42 supplies containers 3 seriatim to a receding end of the conveyor belt 49 and feed mechanism 44 supplies filter elements 1 to that same end of the belt 49, generally seen at the upper right position of FIG. 4A. A plurality of filter elements generally designated as 1 (corresponding to the preceding drawings) are shown received in the feed mechanism 44, in a generally horizontal orientation. The feed mechanisms 44 includes back support elements 22 and spring arms 24, between which the elements 1 are engaged in the gravity feed position as indicated. Feed mechanism 42 similarly includes support elements 26 and spring arms 28 providing the same type of gravity feed control mechanism as the feed mechanism 44. Alternative feed mechanisms 42 and 44 may be used. For example, the respective containers 3 and filter elements 1 may be advanced through the mechanisms in an upright or vertical manner, until they reach a position near said belt 49 where they are rotated by 90° into a generally horizontal position, as shown in the FIG. 4A embodiment. Of course, several other alternative feed mechanisms may be employed, which are well known in the art, to supply the components to the troughs 41 and 43.

As the conveyor belt 49 advances, longitudinally aligned receiving troughs 41 and 43 rotate up into position to engage one of the containers 3 and a corresponding one of the filter elements 1 respectively, to remove same from the respective feed mechanisms 42 and 44, and advance same along an assembly path defined by the travel path of the conveyor belt 12 indicated by the arrow. It will be appreciated that the slide troughs 43 serve a dual function in that they not only provide for selecting one element 1 seriatim from the feed mechanism 44, but also provide an alignment slide along which the filter elements 1 are advanced (corresponding to surface 23 in FIG. 3A) for insertion into the containers 3 located in corresponding container troughs 41.

Part way down the travel of belt 49, there is seen a vibratory feed mechanism 32, suitably supported and elevated with respect to belt 49 by a support unit 36, for supplying the guide elements 2 down a gravity feed chute 34 to a position immediately in front of each element 1 in its corresponding slide trough 43. A suitable vibratory feed mechanism, as shown at 32 for example, is known as model No. VF210S, commercially available from Feeder Corporation of America, Melrose Park, Illinois. The mechanism 32 operates to supply a guide element 2 in correctly oriented position (i.e., the protuberance 11 is elevated with respect to the surface and the length is aligned with the axis of the trough), via feed chute 34 to a corresponding slide trough 43. As the guide elements proceed down the feed chute 34, they have a tendency to bunch up and overlap each other at the flanges 17. Therefore, the slightly raised portions 16 are stamped on the flanges 17 in order to prevent the problem of overlapping and maintain the guide elements in proper feed position.

Further down the path of travel (indicated by broken line A—A) of the belt 49, at an assembly portion of the belt 49, there is seen a stationary bar cam 45 supported by support unit 36, above the slide troughs 43 at an angle to the substantially rectilinear path of travel. As the belt 49 continues in its travel, the bar cam 45 contacts each filter element 1 and causes it to slide along its corresponding slide trough 43. Each element 1 in turn advances the corresponding spring guide element 2 toward the corresponding container 3. An opening 47 is provided between each of said respectively aligned troughs 41 and 43, for receiving the lip 5 of the container 3 received in the container trough 41 to present an unobstructed transition as the filter element 1 and guide element 3 slide from the surface of slide trough 43 to the internal surface of the container 1. Near the end of the assembly portion, a second bar cam 48 (corresponding to stop 25 in FIG. 3A) is provided, fixedly supported by support unit 36 and slightly angled to force the lip 5 of each container 3, in its corresponding container trough 41, against the edge of the corresponding slide trough 43 at slot 47, to present a continuous sliding surface for said corresponding elements. In the alternative, the slide trough and the corresponding container trough may be considered as a single trough with an opening 47, as recited above.

The exhaust chute 50 receives the assembly 20, comprising the container 3 containing the filter element 1 and the guide element 2 therein. By the serpentine path of the respective arms 50a, 50b, 50c and 50d, the chute 50 translates and rotates the assembly 20 so that the latter is then positioned on a further conveyor belt 60 with the open end (in which the inserted filter element 1 may now be seen) in an upright position. The conveyor belt may then translate the assembly 20 to a further processing station for assembling it with a cover plate, sealing and performing other final processing steps to achieve a finished product.

It is recognized that alternative embodiments of this invention may be developed which employ a centrifugal force, gravity or a direct driving force to slide the two elements into the container.

Figure 4B:
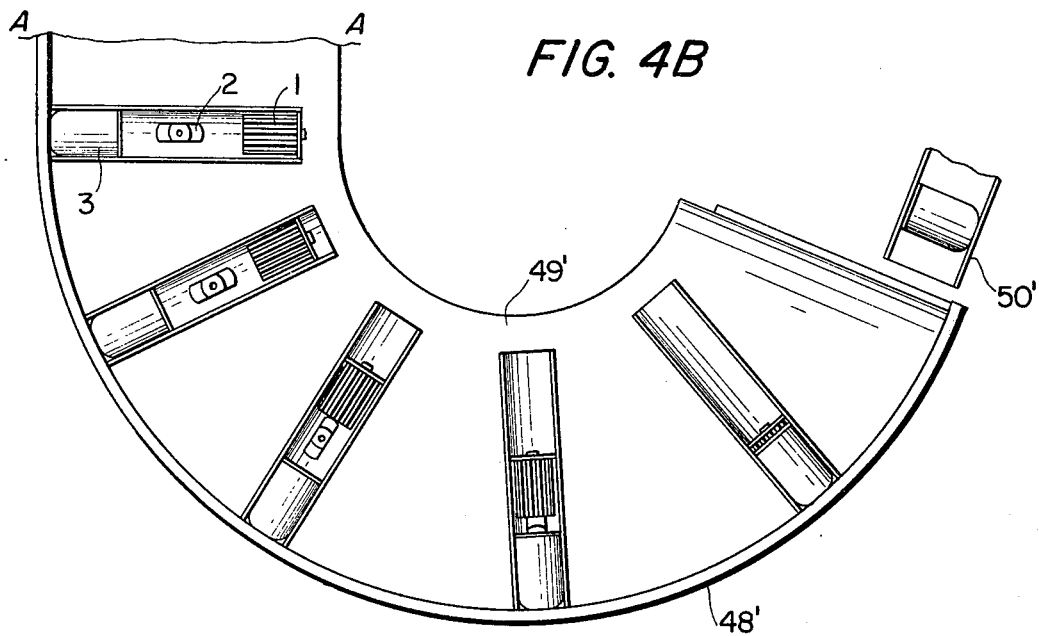
FIG. 4B is a top view of an alternative embodiment, of the automatic assembly machine of FIG. 4A, employing centrifugal force to effect the assembly.

FIG. 4B represents an alternative, to the embodiment shown in FIG. 4A, wherein the force required to slide the filter elements 1 and the guide elements 2 into the container 3 is a centrifugal force. The embodiment shown in FIG. 4B is a top view of the assembly portion of the belt 49 in FIG. 4A extended from broken line A—A wherein similar parts of the assembly are indicated with ( '). Rather than employing the bar cam 45, as shown in FIG. 4A, to force the elements into the container, FIG. 4B shows the assembly portion of the belt 49' adapted to make a rapid and sharp turn. The containers 3 rest in troughs 41' and are forced against slide troughs 43' by a bar 48'. As the belt 49' moves rapidly around the turn, the elements are centrifugally forced to slide into the container 3.

Figure 4C:
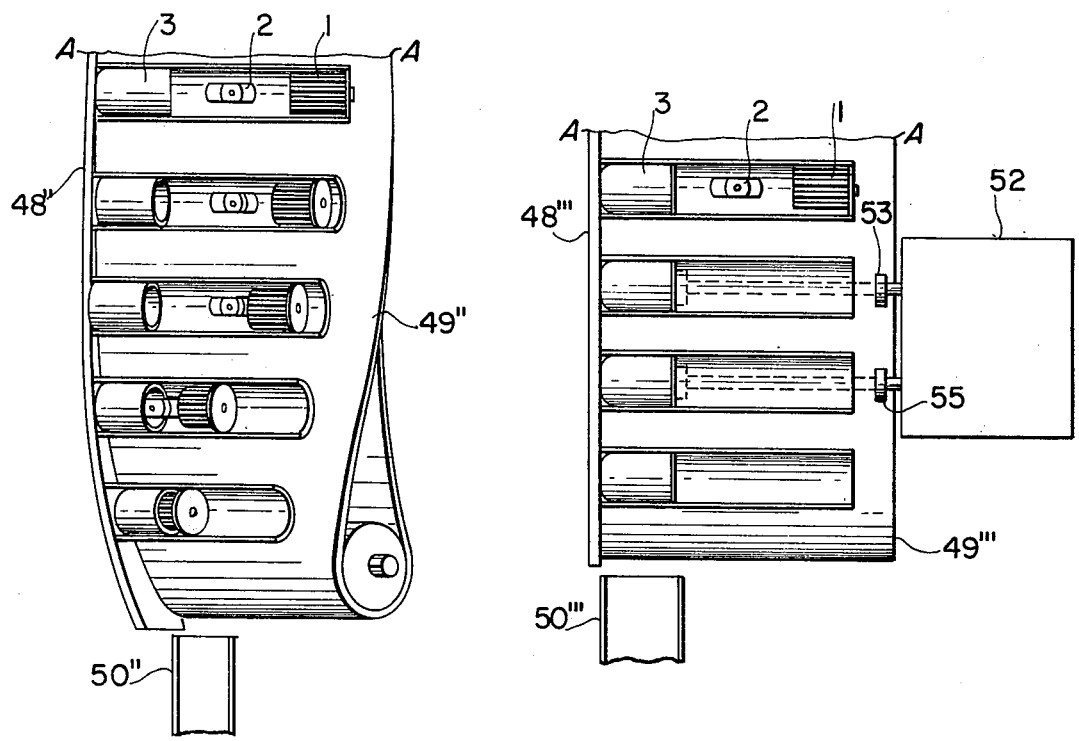
FIG. 4C is a top view of an alternative embodiment, of the automatic assembly machine of FIG. 4A, employing gravitational force to effect the assembly.

FIG. 4C represents another alternative, to the embodiment shown in FIG. 4A, wherein the force required to slide the filter elements 1 and the guide elements 2 into the container 3 is a gravitational force. The embodiment shown in FIG. 4C is a top view of the assembly portion of the belt 49 in FIG. 4A extended from broken line A—A, wherein similar parts of the assembly are indicated with ( "). Rather than employing the bar cam 45, as shown in FIG. 4A, to force the elements into the container, FIG. 4C shows the assembly portion of the belt 49" twisted by an amount sufficient to cause the placed elements to slide down the troughs 43" and into the container by the force of gravity. The bar 48" serves to force the containers 3 against the troughs 43" and also retain the containers 3 in the container troughs 41" until they are removed at the exhaust chute 50".

Figure 4D:
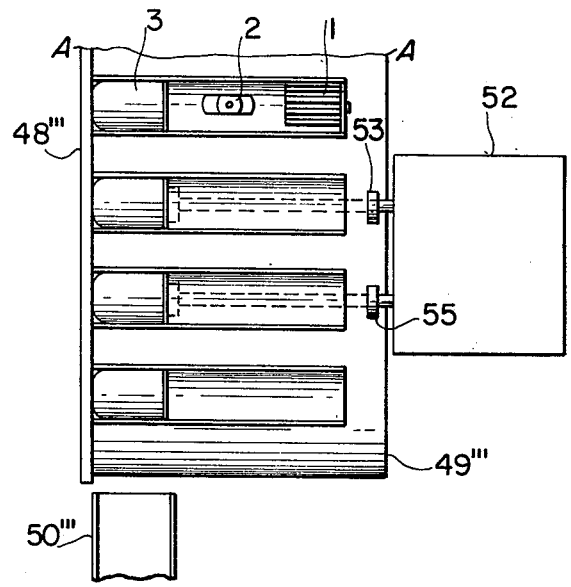
FIG. 4D is a top view of an alternative embodiment, of the automatic assembly machine of FIG. 4A, employing a direct plunger action to effect the assembly.

FIG. 4D also represents an alternative, to the embodiment shown in FIG. 4A. The embodiment in FIG. 4D is a top view of the assembly portion of the belt 49 in FIG. 4A extended from broken line A—A, wherein similar parts of the assembly are indicated with ( '''). In the assembly portion, the cam bar 45 is shown replaced with a reciprocating plunger mechanism 52 which may be electrically, mechanically, or optically actuated to force the elements into the container 3 when the troughs are properly aligned in front of the plungers 53 and 55. The assembled filter unit then proceeds to the exhaust chute 50'''. It is understood that the plunger mechanism 52 may be modified to include more or less plungers than are indicated in FIG. 4D.

Furthermore, due to the basic discovery by the applicant that the elements may be properly seated in the container by a single sliding motion, the above alternative embodiments are only illustrative of the many variations which may be effected without departing from the scope of the novel concept of this invention. Therefore, it is intended by the appended claims to cover all such modifications and variations which fall within the true spirit and scope of the invention.

I claim:

1. A method of assembling components of a filter, said components including a cylindrical container having a cylindrical internal wall, an open end and a closed end with an internal, generally concave surface, a generally cylindrical filter element, a guide element of elongated configuration including a central portion and a first and second resilient legs depending downwardly from said central portion, said guide element central portion engaging a mating portion of said cylindrical filter element to center said filter element within said container when said components are assembled into axially aligned relationship, comprising the steps of:

positioning a container and a filer element in aligned, parallel, axial relationship with a guide element disposed therebetween, said guide element being positioned with its elongated dimension in parallel relation to said parallel axes of said container and said filter element, and effecting relative motion of said container, said guide element and said filter element along said parallel axes and into assembled relation with said filter element and said guide element inserted within said container, said filter element engaging a first end of said guide element and advancing said guide element into said container along said cylindrical interior wall with said downwardly depending legs thereof engaging said wall and said central portion thereof displaced from said wall, and continuing the relative movement of said container and said guide element with said filter element engaging said first end of said guide element to cause the other end of said guide element to slide along the internal concave surface of said container and thereby rotate into an axially aligned, seated position within said container adjacent said concave internal surface thereof, and completing the relative motion of said filter in said container to engage said receiving surface of said filter element on said central portion of said guide element thereby centering said filter element within said container.

2. A method of assembling components of a filter as in claim 1, wherein said step of effecting relative motion is performed by preventing said container from moving axially, and sliding said filter element along said parallel axes and into said assembled relation.

3. An apparatus for automatically assembling a cylindrical filter element and a spring guide element into a cylindrical container, comprising:

means defining plural elongated troughs for movement along a path, each trough having a sliding surface, extending transverse to said path;

container supply means for supplying a said container, in a predetermined orientation, to each of said troughs;

filter element supply means for supplying a said filter element in a predetermined orientation, to each of said troughs;

guide element supply means for supplying a said guide element, in a predetermined orientation, to each of said troughs between said container and said filter element;

means for sliding said filter element and said guide element into said container, and automatically reorienting said guide element into axially aligned position within said container for seating said filter element concentrically within said container.

4. An apparatus as in claim 3, wherein said cylindrical container has an open end and an internally concave closed end; and said container supply means supplies a said container to each of said troughs with the axis of said cylindrical container parallel to said trough and said open end of said container oriented to receive said filter element and said guide element.

5. An apparatus as in claim 4, wherein said guide element is an elongated structure having a major dimension, defined by two outwardly extending, downwardly angled legs, and a substantially circular upward protuberance of a first diameter located at the center of said major dimension; said guide element supply means supplies a said guide element to each of said troughs oriented with said legs contacting said sliding surface, said major dimension substantially parallel with said axis of said cylindrical container, and said protuberance elevated with respect to said sliding surface.

6. An apparatus as in claim 5, wherein said cylindrical filter element has an end plate with a circular depression of a second diameter slightly greater than said first diameter; said filter element supply means supplies a said filter element to each of said troughs oriented with said end plate facing towards said guide element and said open end of said cylindrical container, and the axis of said cylindrical filter element parallel to said axis of said cylindrical container.

7. An apparatus as in claim 4, wherein the open end of said cylindrical container contains an outwardly protruding, circumferential lip; each of said troughs includes an opening defined by edges in said troughs transverse of said sliding movement in said trough for receiving said lip therein; means is provided for retaining said received lip against one edge of said trough adjacent said opening during assembly, to maintain a continuous sliding surface for said guide element and said filter element.

8. An apparatus as in claim 7, wherein said retaining means is a bar cam which contacts the closed end of said container as it moves along said path, and said retaining means is slightly angled with respect to said path.

9. An apparatus as in claim 6, wherein said path is substantially rectilinear.

10. An apparatus as in claim 9, wherein said means for sliding is a stationary bar cam elevated above said troughs and extending angularly to said path to contact each successive said filter element during movement by said movement means engaging said bar cam and said bar cam sliding said filter element, and said filter element engaging and sliding said guide element, into said container.

11. An apparatus as in claim 9, wherein said means for sliding is a reciprocating plunger mechanism which forces said filter element, and said filter element engages and slides said guide element into said container.

12. An apparatus for automatically assembling a cylindrical filter element and a spring guide element into a cylindrical container, comprising:

conveyor means for providing movement along an assembly path;

elongated slide troughs, each having a sliding surface, mounted on said conveyor means transverse to said assembly path for movement therealong;

elongated container troughs mounted on said conveyor means transverse to said assembly path for movement therealong, wherein each said container trough corresponds to a slide trough and is longitudinally aligned therewith;

container supply means for supplying a said container, in a predetermined orientation, to each of said container troughs;

filter element supply means for supplying a said filter element, in a predetermined orientation, to each of said slide troughs;

guide element supply means for supplying a said guide element, in a predetermined orientation, to each of said slide troughs between said container and said filter element;

wherein said movement of said conveyor means causes a force to develop along said slide troughs to slide said filter element preceded by said guide element into said container to thereby reorient said guide element with respect thereto and seat said filter element within said container, completing said assembly.

13. An apparatus as in claim 12, wherein said assembly path of said conveyor means is curved for developing a centrifugal force for sliding said filter element, preceded by said guide element, into said container.

14. An apparatus as in claim 12, wherein said assembly path of said conveyor causes said guide element and said filter element to be elevated with respect to said container, for sliding said elements into said container by the force of gravity.

15. An apparatus as in claim 12, wherein said assembly path is substantially rectilinear and a stationary bar cam is provided elevated above said troughs and extending angularly to said assembly path to contact each successive said filter element during movement by said conveyor means, said bar cam engaging and sliding said filter element and said filter element engaging and sliding said guide element into said container.

16. An apparatus for assembling components of a filter, said components including a cylindrical container having a cylindrical internal wall, an open end and a closed end with an internal, generally concave surface, a generally cylindrical filter element, a guide element of elongated configuration including a central portion and first and second resilient legs depending downwardly from said central portion, said guide element central portion engaging a mating portion of said cylindrical filter element to center said filter element within said container when said components are assembled into axially aligned relationship, said apparatus comprising:

means for positioning a container and a filter element, in aligned, parallel axial relationship and for positioning a guide element therebetween, said guide element being positioned with its elongated dimension in parallel relation to said parallel axes of said container and said filter element; and means for effecting relative motion of said container and said filter element along said parallel axes and into assembled relationship with said filter element and said guide element inserted within said container whereby said filter element engaging a first end of said guide element and advancing said guide element into said container along said cylindrical interior wall with said downwardly depending legs thereof engaging said wall and said central portion thereof displaced from said wall, causing the other end of said guide element to slide along the internal concave surface of said container and thereby rotate into an axially aligned, seated position within said container adjacent said concave internal surface thereof, and engaging said receiving surface thereof, central portion of said guide element thereby centering said filter element within said container.

17. An apparatus for assembling components as in claim 16, wherein said means for effecting relative motion comprises a conveyor assembly for transporting said positioned container, guide element and filter element along a path which causes a centrifugal force to develop along said parallel axes thereof to effect said relation motion.

18. An apparatus for assembling components of a filter as in claim 16, wherein said means for effecting relative motion of said container, said guide element and said filter element comprises a conveyor assembly for transporting said positioned components along a twisted path for disposing said guide element and said filter element above said container such that gravitational force produces said relative motion.

19. An apparatus for assembling components of a filter as in claim 16, wherein said means for effecting relative motion of said container, said guide element and said filter element is a conveyor apparatus, for transporting said positioned components along a substantially rectilinear path and a stationary cam means contacting said filter element, to thereby develop a force along said parallel axes to effect said relative motion.

20. An apparatus for assembling components of a filter as in claim 16, wherein said means for effecting relative motion of said container, said guide element and said filter element is a reciprocating plunger mechanism which pushes said filter element preceded by said guide element along said parallel axes.

* * * * *

UNITED STATES PATENT AND TRADEMARK OFFICE
CERTIFICATE OF CORRECTION

PATENT NO. : 3,994,059
DATED : November 30, 1976
INVENTOR(S) : EDWARD F. WATSON

It is certified that error appears in the above-identified patent and that said Letters Patent are hereby corrected as shown below:

Column 3, line 6, cancel "1A and 1B" and substitute --1 and 1A--;

Column 6, line 51, cancel "filer" and substitute --filter--*; and

Column 10, line 12, cancel "relation" and substitute --relative--.

Signed and Sealed this

Fifteenth Day of March 1977

[SEAL]

Attest:

RUTH C. MASON
Attesting Officer

C. MARSHALL DANN
Commissioner of Patents and Trademarks